Feb. 18, 1964 J. J. PAKAN 3,121,847

FREQUENCY SELECTIVE DISTRIBUTION DEVICE

Filed April 21, 1959 3 Sheets-Sheet 1

Inventor
John J. Pakan
By:
Marshall A. Burmeister
Attorneys

FREQUENCY SELECTIVE DISTRIBUTION DEVICE

Filed April 21, 1959 3 Sheets-Sheet 2

Inventor
John J. Pakan
By:
Marshall A. Burmeister
Attorneys

Inventor
John J. Pakan
By:
Marshall A. Burmeister
Attorney 3,121,847

FREQUENCY SELECTIVE DISTRIBUTION DEVICE

John J. Pakan, Elmwood Park, Ill., assignor to A. R. F. Products, Inc., River Forest, Ill., a corporation of Illinois Filed Apr. 21, 1959, Ser. No. 807,950
17 Claims. (Cl. 333—9)

The present invention relates to devices for detecting the presence of radio frequency signals and for determining the frequency of such detected signals. More particularly, the present invention relates to band pass filters and means for interconnecting a plurality of band pass filters to form a frequency selective signal distribution system.

One type of equipment for detecting the presence of radio frequency signals present in a particular portion of the spectrum utilizes a plurality of band pass filters coupled to a common transmission or distribution line, the band pass filters being tuned to different frequencies to cover the entire frequency range under consideration. A filter suitable for use in such a device is disclosed in the patent application of the present inventor entitled "Tunable Filter," Serial No. 729,272, filed April 18, 1958, now Patent No. 3,074,035, and this application is a continuation-in-part thereof.

It is one of the objects of the present invention to provide a novel band pass filter which is readily constructed to exhibit suitable electrical characteristics for use in such a frequency selective signal distribution system.

Further, it is an object of the present invention to provide a novel distribution line which may readily be constructed with electrical characteristics suitable for coupling signals to a plurality of band pass filters.

In addition, it is an object of the present invention to provide a frequency selective signal distribution system which reduces the required space for a given electrical response.

These and further objects of the present invention will be more readily apparent from a further reading of this disclosure, particularly when viewed in the light of the drawings, in which.

Figure 1:
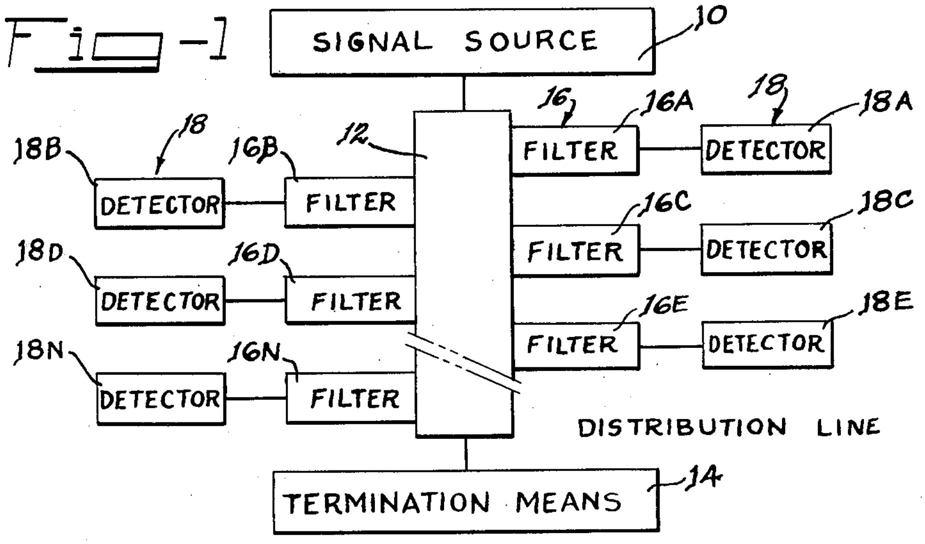
FIGURE 1 is a block schematic diagram of a frequency selective radio frequency distribution device constructed according to the present invention.

As illustrated in FIGURE 1, a signal source 10 is connected to one end of a transmission or distribution line 12 and the other end of the distribution line 12 is terminated in a termination means 14. The signal source 10 is assumed to transmit signals to the distribution line over a wide range of frequencies, and a plurality of filters 16 are coupled to the distribution line 12. Each of the filters 16, specifically designated 16A, 16B, 16C, 16D, 16E . . . 16N, is connected at its end opposite the distribution line 12 to a detector 18, the detectors being specifically designated 18A, 18B, 18C, 18D, 18E . . . 18N respectively. Each of the filters is tuned to a unique frequency interval and the filters cover the entire frequency range under investigation. As a result each signal from the source 10 will be detected by at least one of the detectors 18A, 18B . . . or 18N. If the frequency of the signal to be detected occurs near the edge of the band pass of one filter and close to the edge of the band pass of another filter, the signal may be detected in the detectors connected to both of these filters, since the filters overlap to avoid a hiatus.

Figure 2:
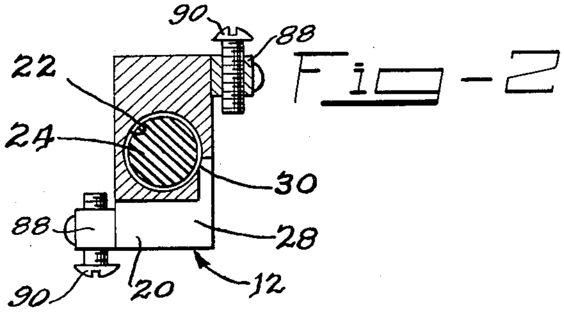
FIGURE 2 is a transverse sectional view of the distribution line diagrammatically illustrated in FIGURE 1, the filters having been removed for clarity and the section being taken along the line 2—2 of FIGURE 3.
Figure 3:
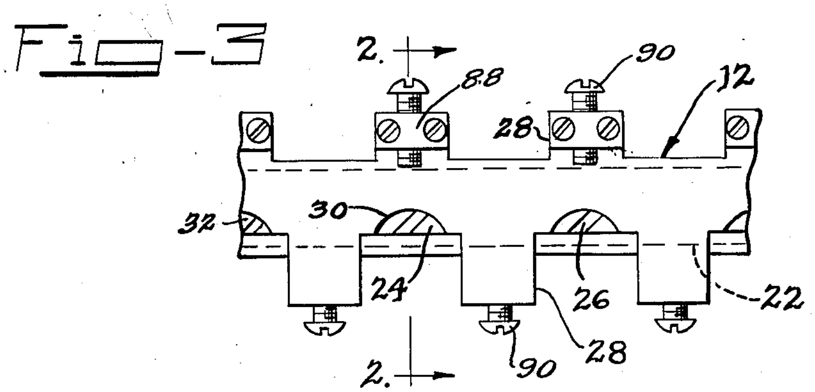
FIGURE 3 is a plan view of the distribution line illustrated in FIGURE 2.
Figure 4:
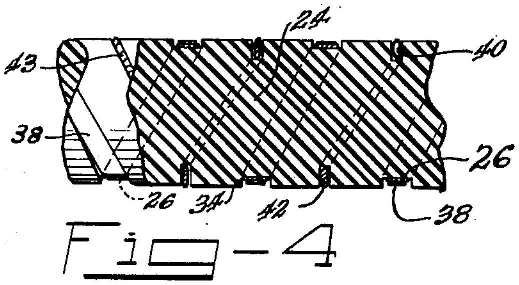
FIGURE 4 is a partly elevational and partly sectional view of the inner element of the distribution line of FIGURES 2 and 3.

The distribution line 12 is best illustrated in FIGURES 2, 3 and 4, the filters 16A, 16B . . . 16N having been removed. The distribution line has a generally rectangular elongated housing 20 constructed of electrically conducting material. A cylindrical channel 22 is disposed along the axis of the housing 20, and a rod 24 of electrically insulating material is disposed within the channel 22. The rod 24 is cylindrical in shape and is provided with a spiral electrically conducting strip 26, as will later be hereinafter explained.

The housing 20 is provided with spaced rectangular cutouts or recesses 28 at spaced intervals along opposite sides of the channel 22. The cut-outs 28 extend close to the channel 22, but do not penetrate the channel. Also, the cutouts 28 on one side of the channel confront the space between cutouts on the other side of the channel. Further, a semi-cylindrical indentation 30 extends toward the axis of the housing 20 from each of the cutouts 28 on one side of the channel along the surface of the housing 20 to produce a semi-circular aperture 32 confronting the rod 24. Each aperture 32 is positioned to centrally confront the electrically conducting strip 26 on the rod 24. From the cutouts 28 on the opposite side of the axis of the housing 20 and in the surface opposite the semi-cylindrical indentations 30, identical indentations 30 extend to form apertures 32 confronting the electrically conducting strip 26 on the rod 24. In this manner, a coupling device may be secured confronting each of the apertures 32 to couple radio frequency energy into or from the distribution line 12. In the particular construction herein disclosed, each of these coupling devices is one of the filters described above and designated 16A, 16B . . . 16N.

FIGURE 4 illustrates the rod 24 partly in section. The rod 24 is constructed of low dielectric loss electrically insulating material, such as Rexolite which is a copolymer styrene. The rod 24 is provided with a helical groove 34 with a rectangular cross-section. The strip 26 of electrically conducting material is disposed in the helical groove 34 and is recessed below the surface of the rod 24. In one particular construction described throughout this specification, the strip 26 is a flat member of nickel silver alloy. A tape 38 of lossy material, such as polyester tape with vaporized aluminum coating is disposed upon the flat surface of the electrically conducting strip 26 for the purpose of introducing distributed loss into the transmission line and reduce reflections. The tape 38 forms a region of lossy electrical insulating, dielectric material.

The rod 24 is also provided with a thin helical slot 40 with the same taper as the flat groove 34 and disposed centrally between adjacent turns of the groove 34. The slot 40 is filled with an electrically conducting member such as beryllium copper wire, designated 42, which contacts the walls of the channel 22, thereby forming a shield between turns of the strip 26. In order to achieve contact with the channel 22, the member 42 is provided in the form of a flattened helix with a turn diameter greater than the depth of the slot 40, the turns being indicated at 43 in FIGURE 4.

Figure 5:
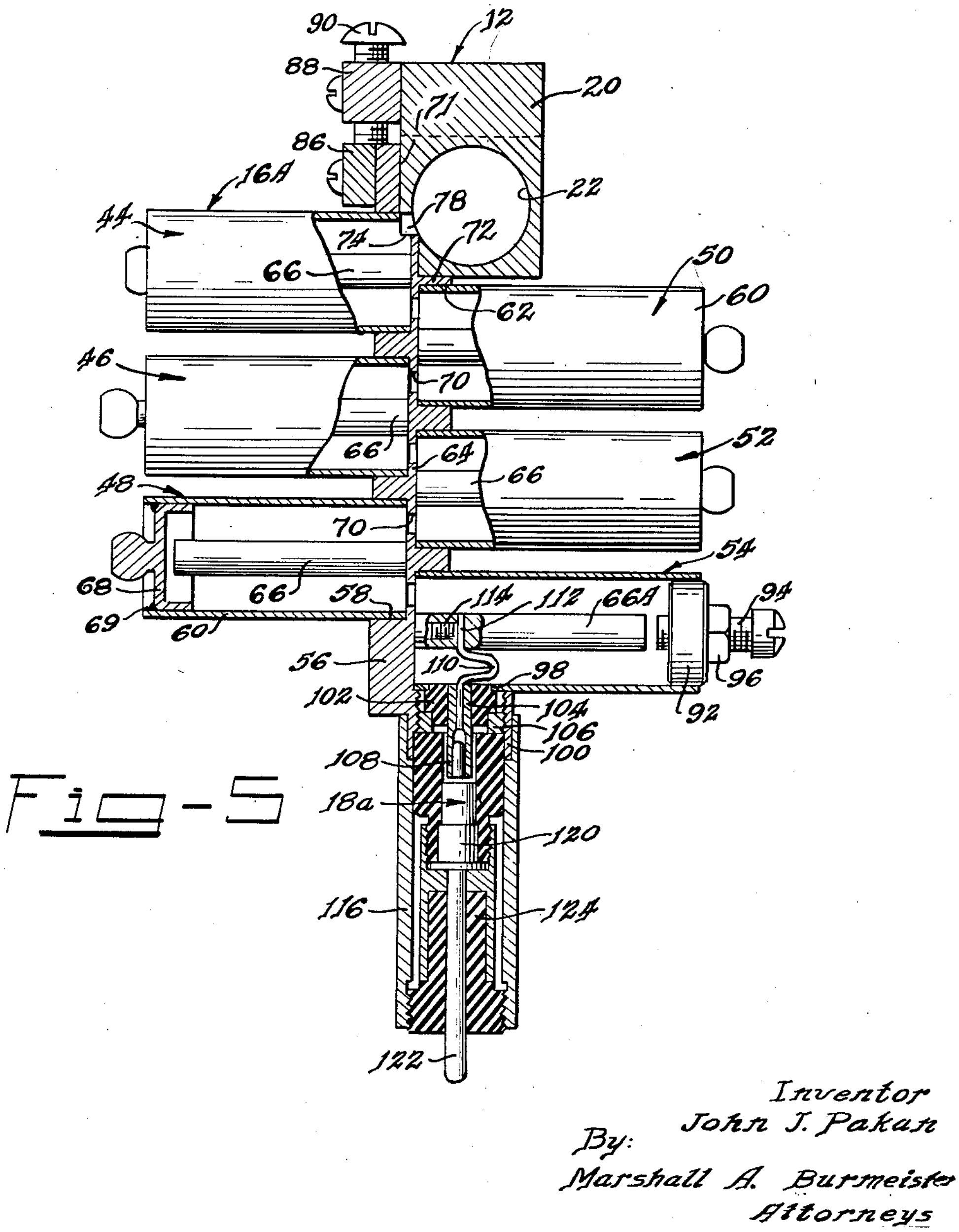
FIGURE 5 is a sectional view of the distribution line and one of the filters shown diagrammatically in FIGURE 1 and taken along the line 5—5 of FIGURE 6.

FIGURE 5 illustrates one of the filters, designated 16A, coupled to the transmission line 12, although it is to be understood that the other filters 16B, 16C . . . 16N are coupled to the transmission line in an identical manner. The filter 16A is also identical to the other filters and includes six quarter wave length cavity resonators, designated 44, 46, 48, 50, 52 and 54, mounted to an elongated rectangular mounting strip 56. The mounting strip 56 is provided with a circular indentation 58 which accommodates an electrically conducting cylinder 60 for each of the resonators. The cylinders 60 of the resonators 44, 46 and 48 are disposed on one side of the mounting strip 56 along the axis of the strip and equally spaced from each other, and the cylinders 60 of the resonators 50, 52 and 54 are disposed within indentations 62, on the other side of the strip 56 which are also equally spaced along the axis of the mounting strip 56. The indentations 58 and 62 extend less than half way into the mounting strip 56 to form a separating wall 64 between the resonant cavities 44, 46 and 48 disposed on one side of the mounting strip 56 and the resonant cavities 50, 52 and 54 disposed on the other side of the mounting strip 56. Further, axes of the cylinders of the cavity resonators are disposed in a common plane and spaced by a distance less than the diameter of the electrically conducting cylinder 60, the resonant cavities 44, 46 and 48 having their axis disposed centrally between the axes of the resonant cavities 50, 52 and 54 disposed on the opposite side of the mounting strip 56. As a result, the resonant cavities on one side of the mounting strip 56 are isolated from those on the other side of the mounting strip 56 only by the separating wall 64.

Each of the resonant cavities has a rod 66 which extends from the wall 64 along the axis of the cylinder 60. Also, the end of the cylinder 60 opposite the wall 64 is sealed by a cap 68 which is electrically connected and sealed to the cylinder 60, for example by a ring of solder 69 disposed between the cap 68 and cylinder 60. The cap 68 is spaced from the end of the rod 66. As a result of this construction, there is a low current region in each of the resonant cavities adjacent to the cap thereof, and a high current region adjacent to the wall 64 when the resonator is excited at its resonant frequency.

The wall 64 is provided with orifices 70 between each of the resonators 44, 46, and 48 on opposite sides of the mounting strip 56 and one of the resonators 50, 52 and 54 on the other side of the mounting strip 56 to couple the resonators in cascade. Since the orifices 70 are located in high current regions of the resonant cavities, they affect relatively close coupling. In this manner, resonant cavity 44 is connected in cascade with resonant cavity 50, cavity 50 is connected in cascade with cavity 46, cavity 46 is connected in cascade with cavity 52, cavity 52 is connected in cascade with cavity 48, and cavity 48 is connected to cavity 54.

The first resonant cavity in the chain is designated 44, and it is coupled to the transmission line 12. As indicated in FIGURE 5, the end of the mounting strip 56 has a cut away portion 71 on the side thereof opposite the resonant cavity 44 which terminates in a shoulder 72 extending from the separation wall 64 normal to the axis of the support strip 56 and approximately in line with the rod 66 of the resonant cavity 44. This cutaway portion 71 also extends along a plane parallel to the axis of the mounting strip 56 which extends into the cavity resonator 44 forming a second shoulder 74 parallel to the axis of the resonator 44. Since the second shoulder 74 extends through the resonant cavity 44, an orifice 78 is formed for coupling the resonant cavity 44 to the transmission line 12.

As is clear from FIGURES 2, 3, and 5, the filter 16A may be attached to the transmission line 12 by placing the shoulder 72 against the housing 20 within one of the rectangular cutouts 28, thereby aligning the orifice 78 with one of the apertures 32 of the transmission line 12. The surface of the cutaway portion 71 of the mounting strip 56 abuts the exterior surface of the housing 20 of the transmission line to form a good electrical contact.

As a result, electrical energy will be transferred from the transmission line 12 into the cavity resonator 44.

Figure 6:
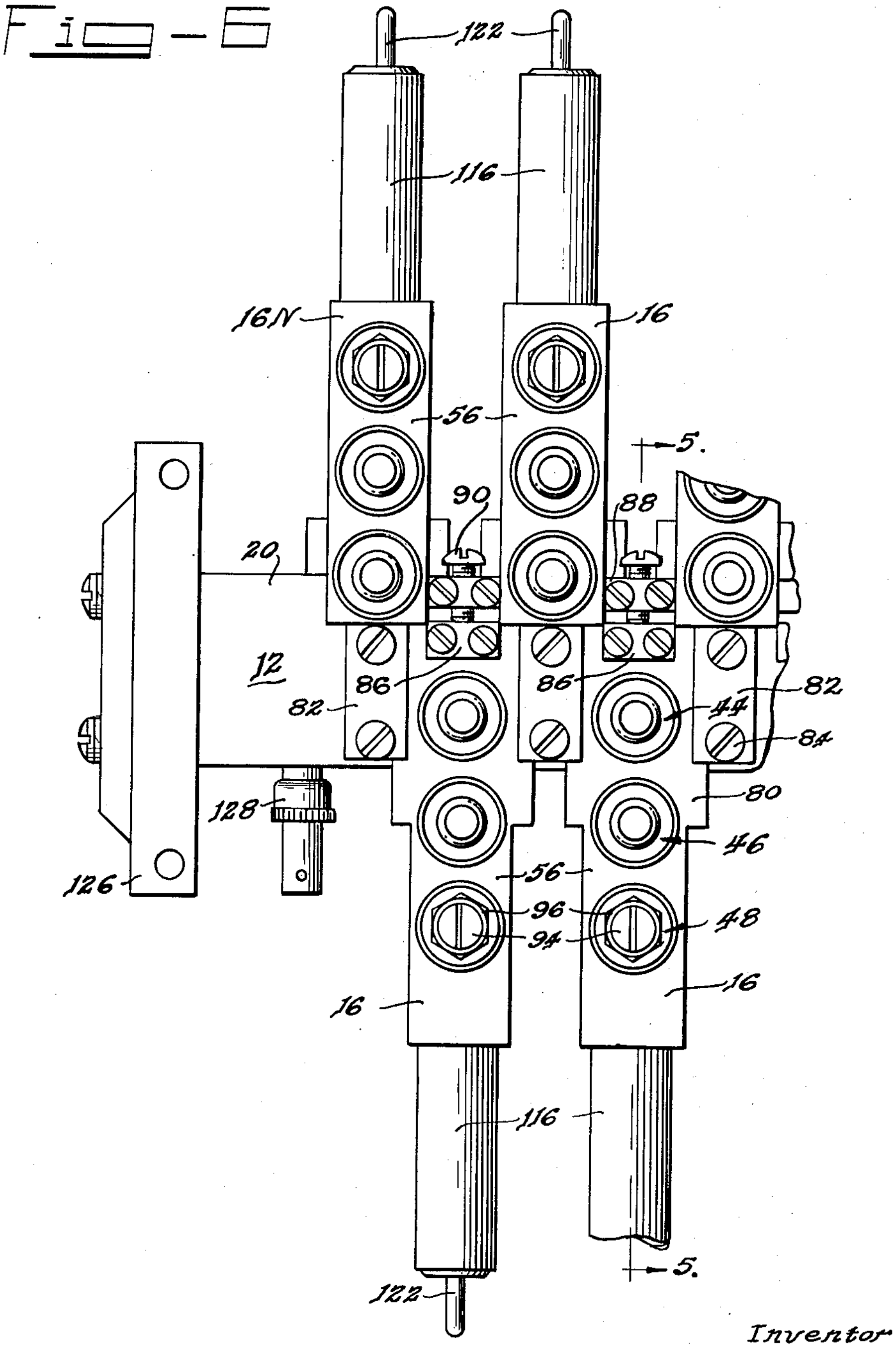
FIGURE 6 is a plan view of the assembly of filters and distribution line.

As is clear from FIGURE 6, the mounting strip 56 for each of the filters is provided with outwardly extending flanges 80 which extend outwardly from the strip 56 adjacent to the end of the resonator 44, and the filters are secured in position by mounting strips 82 which are anchored by screws 84 into the housing 20 of the transmission line 12. Also, a block 86 is secured to the end of the mounting strip 56 adjacent to each cavity resonator 44 and confronts a screw journalling block 88 which is secured to the housing 20 of the transmission line and threadedly engages a screw 90. The screw 90 abuts the block 86 and is used to adjust the position of each of the filters relative to the confronting aperture 32 in the transmission line 12. If the filter is permitted to abut the block 88, maximum electrical coupling will be achieved between the resonator 44 of that filter and the transmission line 12. However, the magnitude of the overlap of the aperture 32 and orifice 78 may be reduced by forcing the filter away from the block 88, thereby reducing the coupling between the cavity resonator 44 and that transmission line 12.

The output of each of the filters is taken from the last resonator of the series, namely resonator 54. In all of the other cavities, the caps 68 are secured in place permanently, for example like soldering the caps to the cylinders 60. This is possible, since the cavities need not be returned once proper assembly has occurred. However, since the resonator 54 is matched to an output which may be periodically changed or require replacement, it is necessary that the cavity 54 be adjustably tuned. For this reason the cavity 54 is provided with a disc 92 which is secured at the end of the cylinder 60 opposite the wall 64 and a screw 94 threadedly extends through the disc 92 and is aligned with and confronts the center conductor or rod 66A of the resonator 54. Adjustment of the space between the confronting ends of the rod 66A and screw 94 is effective to change the resonant frequency of the cavity resonator 54. A lock nut 96 is provided to maintain the screw in position, once the cavity 54 has been properly tuned.

A circular opening 98 is disposed in the wall of the cylinder 60 of the resonant cavity 54, adjacent to the separation wall 64 and confronting the rod 66A on the side thereof opposite the resonant cavity 52. A sleeve 100 is secured to the exterior surface of the cylinder 60 about the opening 98 and is provided with threads on its inner surface. An electrically insulating washer or ring 102 having an axial bore 104 is secured in the opening 98 by a lock ring 106 which engages the threads on the sleeve 100. An electrically conducting sleeve 108 extends through the bore 104 of the electrically insulating ring 102, and a wire shaped conductor 110 extends through the sleeve 108, forms a loop between the cylinder 60 and the rod 66A, and is jurnalled within a bore 112 in the rod 66A aligned with the center of the opening 98. The wire shaped conductor 110 forms a coupling loop within the cavity resonator 54, and the amount of coupling achieved by the conductor 110 is adjustable by positioning the loop closer to the wall 64 or more remote therefrom. Since this is achieved by rotation of the conductor 110, a set screw 114 is disposed within the rod 66A is provided to lock the loop 110 in position.

The filters 16A, 16B, 16C . . . 16N are tuned to pass different but overlapping frequency ranges for applications intended to cover a portion of the frequency spectrum without a hiatus. Further, each of the resonators 44, 46, 48, 50, 52 and 54 of each filter is tuned to the same frequency with tight coupling to provide a broad band pass, as is well known and fully set forth in the application of the present inventor referred to above.

The detector 18A is physically disposed within a sleeve 116 mounted about the periphery of the sleeve 100, and the detector 18A is electrically connected to the wire conductor 110. As illustrated in FIG. 5 the detector 18A includes a crystal or diode 120 and terminates in an output connector having a center conductor 122 and employing the sleeve 116 as the outer conductor thereof. The center conductor 122 is retained in position by an electrically insulating retaining screw 124.

While for purposes of this disclosure, the details of the detector are not fully described, it is to be understood that for some purposes the output of the diode 120 is connected to a display device or an alarm system, all of which is intended to be included in the term detector as used in describing FIGURE 1.

It is to be noted from FIGURE 6 that the distribution line 12 and filters 16A, 16B, 16C . . . 16N constitute a single assembly, and may be mounted on bracket 126. Further, the filters designated 16A, 16C, 16E . . . are mounted to one side of the distribution line 12, while the filters 16B, 16D and 16N are mounted to the opposite side of distribution line 12. It is thus clear that the length of the distribution line required for a given number of filters has been minimized by this construction. It is also clear that by mounting the cavity resonators in each filter in the manner disclosed, the space required for each filter has been minimized.

The distribution line 12, as stated above, is terminated in its characteristic impedance by the means 14. In the particular construction here described, the termination means 14 is located exterior to the distribution line, and an output coupler 128 is mounted to the housing 20 and electrically connected to the electrically conducting helical strip 26 in the manner described in the inventor's above referred to application. The impedance reflected on the distribution line by each of the filters may be different than the characteristic impedance of the line, or the impedance of the line between filters. However, the voltage standing wave ratio may readily be maintained with this construction within permissible limits, and is substantially improved by employing the lossy strip 38 between the electrically conducting helical strip 26 and the housing 20.

It is to be noted that the helical strip 26 of the distribution line passes through the shorted end of the first coaxial cavity resonator, thus providing a high degree of coupling between the distribution line and the filter. Also, the degree of coupling is variable by changing the amount by which the strip 26 penetrates the cavity.

The distribution line 12 with the periodically located apertures 32 has itself the character of a low pass filter with multiple higher, relatively wide, pass bands separated by narrow stop bands. This characteristic arises because for any frequency only one of the filters appears as a load with substantial resistive character, all others being reactances which are nearly the same. In applying the invention, it is therefore important to design the line so that the range of frequencies of interest occur in a pass band. Constructions have been realized in the low pass and first higher band pass. Location of the stop bands may be shifted by changing the length of the distribution line between coupling apertures 32 or the characteristic impedance of the distribution line.

From the foregoing disclosure, those skilled in the art will readily devise many modifications and improvements upon the frequency selective distribution device herein set forth. It is therefore intended that the scope of the present invention be not limited by the foregoing disclosure, but rather only by the appended claims.

The invention claimed is:

1. A signal distribution system comprising a distribution line having one end adapted to be connected to a source of radio frequency signals, said distribution line comprising an elongated rod of electrically insulating material provided with a groove extending about the rod and along the rod, an electrically conducting strip disposed in the groove, and a surface defining member disposed about the rod and spaced from the strip, said member being provided with a plurality of apertures disposed along the length of the rod and confronting the strip, a coupler mounted to the member confronting each of the apertures for coupling radio-frequency energy to a transmission device comprising a hollow electrically conducting shell mounted in abutment with the member of the distribution line and having an aperture confronting the aperture of the distribution line, and means to terminate the end of the distribution line opposite the source of radio frequency signals having an impedance approximately equal to the characteristic impedance of the transmission line.

2. A signal distribution system comprising the elements of claim 1 wherein the coupler comprises means mounted to the member defining a cavity and provided with an orifice confronting the aperture of the member.

3. A signal distribution system comprising the elements of claim 2 in combination with means for adjusting the distance between the orifice of the cavity and the electrically conducting strip, whereby the coupling between the cavity and the transmission line may be varied.

4. A signal distribution system comprising a distribution line having one end adapted to be connected to a source of radio frequency signals, said distribution line comprising an elongated cylindrical rod of electrically insulating material provided with a helical groove extending coaxially about the rod, an electrically conducting strip disposed in the groove, and a cylindrical surface defining member constructed of electrically conducting material disposed about the rod and spaced from the strip, said member being provided with a plurality of orifices at intervals along the length of the rod, each orifice confronting a portion of the electrically conducting strip, a coupler confronting each orifice having a cavity resonator with a high current portion and a low current portion, said cavity resonator having an aperture in the high current portion confronting the orifice in the cylindrical surface defining member, and means to terminate the end of the distribution line opposite the source in an impedance approximating the characteristic impedance of the transmission line.

5. A signal distribution system comprising the elements of claim 4 wherein each of the couplers comprises a plurality of resonators each including a hollow shell of electrically conducting material defining a cavity having a high current region within the shell and a low current region within the shell at the resonant frequency thereof, each shell being provided with two spaced apertures therein adjacent to the high current region, and means for mounting the resonators in an assembly with one of the apertures of a first resonator of each coupler confronting an orifice of the distribution line, and one of the apertures of a second resonator being coupled electrically to a load, the other apertures of the first and second resonators and the apertures of the other resonators each confronting one of the apertures of a different resonator to interconnect the resonators in cascade.

6. A signal distribution system comprising a distribution line having a helical inner conductor and an outer conductor disposed radially outwardly from the helical conductor, a cavity resonator having an electrically conducting shell abutting the outer conductor, said resonator having a high current region within the shell and a low current region within the shell at the resonant frequency of the resonator and an aperture in the shell confronting the high current region, and the outer conductor of the distribution line having an opening confronting the aperture of the shell.

7. A signal distribution system comprising the elements of claim 6 in combination with a plurality of cavity resonators connected in cascade with the cavity resonator abutting the outer conductor.

8. A signal distribution system comprising the elements of claim 6 in combination with a strip of material having a high loss coefficient at the band pass frequency of the cavity resonator disposed between the helical conductor and the outer conductor.

9. A signal distribution system comprising, in combination, a transmission line having a first conductor in the form of a helical coil, and a second conductor disposed coaxially about the coil at a distance from the axis greater than the radius of the coil, and a cavity resonator having a cylindrical electrically conducting shell closed at one end and provided with a plate at the other end thereof, said resonator having an axial electrically conducting rod extending from the plate toward the closed end of the shell and terminating at a distance from the closed end thereof, said resonator having an aperture in the plate thereof, and means for mounting the resonator in abutment with the second conductor of the transmission line with the aperture in the shell confronting the transmission line, and the transmission line having an opening in the second conductor thereof aligned with the aperture of the resonator.

10. A band pass filter comprising, in combination, a support member having a plurality of cylindrical indentations extending therein from opposite sides, said indentations having axes disposed in a common plane and equally spaced from each other by a distance greater than the radius of the indentations and less than the diameter thereof, the indentations on each side of the member extending to first and second spaced common planes to form a partition between the indentations, and said partition having an aperture therein between each pair of adjacent axes of the indentations, a cylindrical hollow shell of electrically conducting material mounted in each of the indentations and extending outwardly from the support member, an electrically conducting rod mounted to the support member and extending coaxially into each cylindrical shell, and an electrically conducting cover mounted across the end of each shell opposite the support member and spaced from the rod.

11. A signal distribution system comprising, in combination, a distribution line having one end adapted to be connected to a source of radio frequency signals, said distribution line comprising an elongated cylindrical rod of electrically insulating material provided with a helical groove extending coaxially about the rod, an electrically conducting strip disposed in the groove, and a cylindrical surface defining member of electrically conducting material disposed about the rod and spaced from the strip, said member being provided with a plurality of orifices at intervals along the length of the rod, each orifice confronting a portion of the electrically conducting strip, means to terminate the end of the distribution line opposite the end adapted to be connected to a source in an impedance approximating the characteristic impedance of the line, and a band pass filter mounted to the distribution line confronting each of the orifices including the elements of claim 10, the aperture at one end of the support member of each band pass filter confronting the adjacent orifice of the distribution line and the aperture at the other end of the support member being adapted to be coupled to a load.

12. A signal distribution system comprising the elements of claim 11 in combination with a helical electrically conducting element disposed between the turns of the electrically conducting strip and contacting the cylindrical surface defining member to form a shield between turns of the helical strip.

13. A signal distribution system comprising the elements of claim 12 in combination with a strip of material having a high loss coefficient at the band pass frequency of the filters disposed between the electrically conducting strip and the cylindrical surface defining means.

14. A transmission line comprising electrically conducting means defining a cylindrical channel, an electrically conducting helical strip disposed within the channel and spaced from the channel defining means, and a helical electrically conducting shield with the same pitch as the helical strip, said shield being disposed approximately equidistant between the turns of the strip and electrically connected to the channel defining means.

15. A signal distribution line comprising the elements of claim 14 wherein the channel defining means is provided with a plurality of orifices spaced from each other and confronting the helical strip.

16. A transmission line comprising electrically conducting means defining a cylindrical channel, an electrically conducting helical strip disposed within the channel and spaced from the channel defining means, an elongated helical electrically conducting element disposed between the turns of the electrically conducting strip and contacting the channel defining means to form a shield between turns of the helical strip, and a layer of material having a high loss coefficient disposed between the electrically conducting strip and the channel defining means.

17. A band pass filter comprising, in combination, a support member of electrically conducting material having a plurality of indentations extending therein from opposite sides, each indentation having two spaced apertures extending through the support member, each of said apertures communicating with a different aperture disposed on the other side of the support member, a hollow shell of electrically conducting material mounted in each of the indentations and extending outwardly from the support member, an electrically conducting rod mounted on the support member between the apertures of each indentation and extending into the shell of said indentation, and an electrically conducting cover mounted across the end of each shell opposite the support member and spaced from the rod.

References Cited in the file of this patent

UNITED STATES PATENTS

| | | |
|---|---|---|
| 2,115,826 | Norton et al. | May 3, 1938 |
| 2,749,523 | Dishal | June 5, 1956 |
| 2,816,285 | Topol | Dec. 10, 1957 |

OTHER REFERENCES

Wild: "Photoetched Microwave Transactions on Microwave Theory and Techniques," vol. MTT-3, No. 2, March 1595. (Pages 21–30 relied on.)